April 30, 1929.  J. J. CHAPMAN  1,711,374
BAND SAW AND PULLEY THEREFOR
Filed Feb. 29, 1928
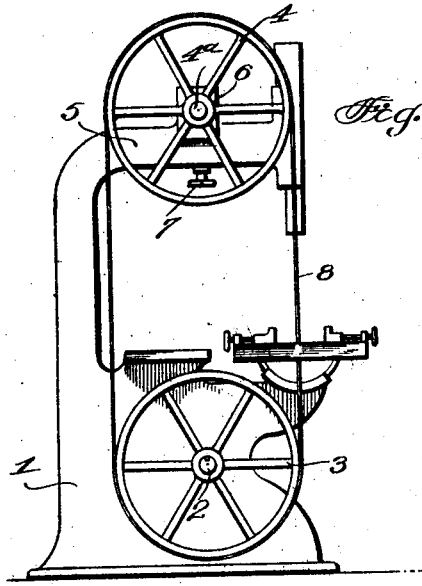
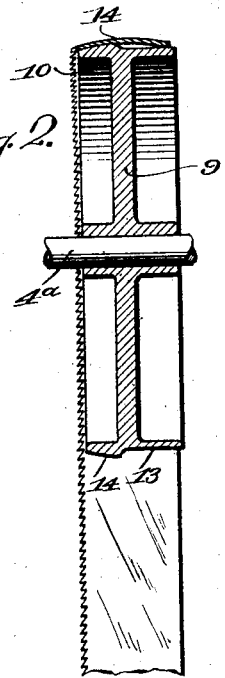
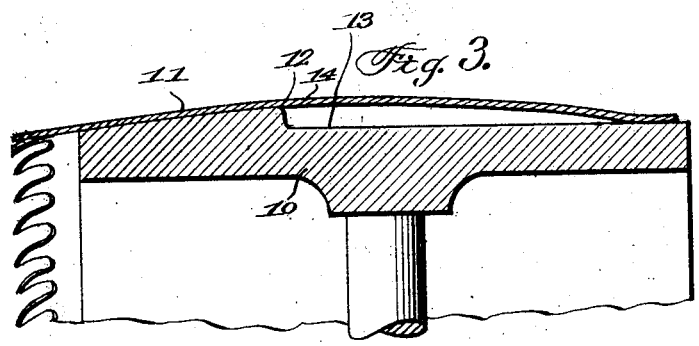
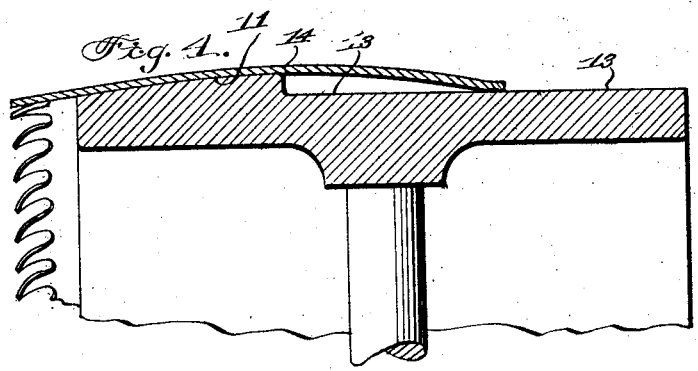
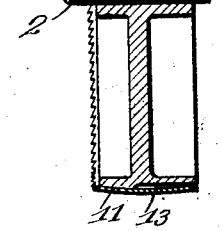
INVENTOR
JAMES J. CHAPMAN
BY
ATTORNEY Patented Apr. 30, 1929.

1,711,374

UNITED STATES PATENT OFFICE.

JAMES J. CHAPMAN, OF ELIZABETH, LOUISIANA.

BAND SAW AND PULLEY THEREFOR.

Application filed February 29, 1928. Serial No. 257,966.

This invention relates to the band saw art, and is more particularly concerned with a construction of pulley for band saws providing for uniform support and tension of the saw and constructed to continue to afford uniform support and tension as the cutting edge of the saw is worn down and its width decreased as well as to maintain the band saw in its proper operating plane and against slippage.

In actual commercial practice, much difficulty is experienced in maintaining the various widths of band saws, as they wear away, in proper position on their pulleys and against slippage thereon from the proper operating plane. This difficulty arises through the varying strains placed upon the front and rear portions of the band saws, as their width is decreased by wear, by the construction and conformation of the peripheral faces of the pulleys.

It is well known in the trade that a band saw, to operate satisfactorily, must have its principal points of tensioning strain on the front and rear portions thereof. As heretofore practised however, pulleys and band saws have been used providing the principal tensioning strain by point or line contact at the front edge of the pulley, thereby subjecting that portion of the saw which is strained to capacity by the sawing operation to additional tensioning strain greatly increasing its tendency to crystallize and fracture.

Band saw pulleys as heretofore constructed fall principally in three classes: (1) A pulley with a full crowned peripheral surface which while eliminating point or line tensioning contact at its front edge, places the principal tensioning strain on the rear portion of the band saw as its width decreases through wear thereby reducing the tension placed upon the front or sawing edge of the band saw to the detriment of the work and additionally causing the band saw to shift on the pulley; (2) A straight peripherally-faced pulley with said face parallel with the axis of the pulley which provides a point or line contact tensioning the saw at the front edge of the pulley and as the front edge of the pulley wears under the strain, reducing its diameter, causes the relatively greater diameter of its rear portion to place the principal supporting tension against the rear portion of the saw, to the detriment of the work and with resultant slippage; and (3) A flat surfaced pulley shouldered down adjacent to its rear edge to produce a rear peripheral portion of reduced diameter approximating and slightly less than a quarter of the width of the pulley giving a three point contact with a band saw under full tension thereagainst. This construction provides a line or point contact at the front edge of the pulley with the disadvantage previously mentioned and limits the use of the pulley to band saws of full or approximately full width. As a matter of fact, large band saws wear down very quickly so that pulleys of this type in addition to the disadvantage of a principal tensioning line contact at the front edge, are limited in their use to substantially full width saws.

One object of the present invention is the provision of a pulley for band saws having its periphery formed to provide a relatively wide and substantially uniform supporting engagement with and tension against a band saw over the front portion of the pulley and rearwardly thereof so constructed as to take band saws of less than full width without reducing, through contact therewith, the greater and substantial tensioning support given the saw through contact with the front portion of the pulley. A relatively wide and substantially uniform tensioning contact is therefore provided over the front portion of the pulley for the front portion of the saw where the strain on the saw and wear on the pulley are greatest and the pulley will take and drive without slippage the varying widths of saw as it is worn without shifting of the pulley to compensate for the difference in saw widths.

A further object of the invention is the provision of pulleys of this type having their front peripheral portion convexed from front edge toward center and plane surfaced rearwardly in combination with a band saw crowned centrally to provide a convexity corresponding substantially to that of the front of the pulleys, and convexed to a less extent at its rear edge to provide the latter when tensioned by the pulley with a slightly greater diameter than the front edge, or in other words, when tension is applied to the saw through the pulley, greater tensioning contact occurs against the saw at its front edge and over its front portion. While the use of a band saw crowned at its back edge as described, in combination with said pulleys is productive of the best results, the construction of the pulley is such that it may be advantageously used with straight back band saws.

The use of pulleys such as described makes it unnecessary to shift the relative positions of pulleys for narrow or worn saws alternately with new or full width saws; maintains relatively uniform tension against the front and rear portions of the various widths of saws used and by reason of the relatively wide contact at the front of the pulley make it possible to carry a greater strain on the cutting edge of the saw than has heretofore been possible, and to maintain the saw on the pulleys against sliding.

These features and advantages will be clearly seen from the following detailed specification which is to be read in connection with the accompanying drawings forming part thereof and in which:—

Figure 1 is a view in side elevation of one form of band saw to which the present invention is applicable.

Figure 2 is a view in vertical section through the pulleys and saw band of a saw of this type constructed in accordance with the present invention.

Figure 3 is an enlarged transverse vertical section through the rim of a pulley shown in Figure 2 showing the peripheral tensioning face of the pulley cooperating with a band saw of full width.

Figure 4 is a similar view illustrating the manner in which the peripheral surface supports and contacts with a saw band of substantially less width as represented here by the original full width band worn down or by an originally narrower band.

The band saw shown in Figure 1 is a conventional type providing the usual stand 1 in the base of which is journaled the power shaft 2 driven through a suitable power pulley (not shown) and carrying on its opposite side the lower driving band pulley 3. The upper tensioning or adjustable band pulley 4 is carried by the usual head 5 of the frame in vertical alinement with the lower pulley 3 and is freely revoluble on a shaft 4ª mounted in bearings 6 for vertical adjustment through, for example, a threaded stem 7 to place the band saw 8 under proper tension. The band guides and work table shown are those of the conventional saw equipment and have no relation to the present invention.

In the case of the present invention, the band carrying pulleys are each of similar construction and hence only one is described in detail, similar identifying reference characters being applied to both. The body of the band pulleys may be of any standard construction, the lower pulley, of course, being keyed to the power shaft and the other pulley being freely revoluble upon its shaft 4ª. The use of the pulleys is not restricted to the vertical type saw shown herein, but is equally efficient when the pulleys are mounted to carry the band saw horizontally.

The rim 10 of my improved saw pulley is formed from the inner edge of its outer periphery for a substantial distance inwardly towards its center as a convex surface 11, terminating at a high point 12 a substantial distance inwardly from the front edge of the pulley and, as shown, slightly forward of the center line thereof. At the point 12, representing the point of maximum diameter, the pulley is cut down and formed with a flat surface 13 parallel with its axis and extending from the point 12 rearwardly to the rear edge of the rim. It is provided, however, where desirable, that convexity 11 may be extended slightly rearwardly of its maximum diameter 12, leaving the saw at that point, for the purpose of strengthening rims weakened by wear. The plane of the flat surface 13 is preferably alined with the front edge of the peripheral surface of the pulley which, as previously stated, is convexed and curves upwardly or outwardly from said edge to a point 12 of maximum diameter. The front portion or peripheral surface of the pulley extending from its front edge to the point 12 provides therefore a substantial bearing for the saw band distributing supporting tension uniformly over the front portion of the saw over a relatively wide area, rather than approximately a line or point at the front edge. The plane of the rearward peripheral surface 13 is as before stated preferably in alinement with the front edge of the pulley. Some slight variation is permissible in the relation of these two points, it being intended primarily that the plane of the rear peripheral surface 13 of the pulley rim should not extend above or outwardly of the plane of the front edge to provide a greater diameter rearwardly of the shoulder 12 than that represented by the extreme front edge of the pulley. This provision is made to prevent greater supporting and tensioning contact against the rear portion of the band than against the front edge of the band where the strain is greatest and where the maximum tension and support should be applied. By providing the front convexed portion 11 terminating adjacent to but forwardly of the center of the pulley a very substantial supporting and tensioning surface is supplied for the front edge portion of the saw band and a support for the rear edge of the saw band even when reduced by wear to the substantially less width shown in Figure 4 is provided by the surface 13 so that the same pulley may be used without shifting its adjustment for a full width saw band from that of its original installation until it has been worn through use to substantially narrow limits. In all stages of varying widths, the rear edge of the band will be engaged by the rearward surface 13 of the rim periphery, but with less tension than the front edge. The tensioning exerted against the saw bands will therefore remain substantially uniform both at front and rear and the differential necessitated by the need for greater supporting tension against the front portion of the band will be maintained, due to the convex surface 11 and the maximum diameter afforded at point 12 and the relation between the front edge of the pulley periphery and the plane of its rearward surface 13. As previously stated, I am able to secure the best results by combining the pulleys of the construction just described with a band saw which is especially formed to cooperate therewith. In the drawings, the band saw shown more particularly in Figure 3 in its full width, and in Figure 4 in its width as reduced by wear, is formed as by rolling longitudinally in the portion intermediate of its edges with a substantial center crown for the purpose of increasing the total length or diameter of the band as it approaches the center of its width. Preferably, also the rear portion of the saw is rolled slightly to convex the back or rear edge thereof, and provided with a total length or diameter greater than that of the front or cutting edge of the saw. The convexity of the saw indicated generically by the numeral 14 in Figures 2 and 3 is such that the front portion thereof will conform substantially to the convexed front portion 11 of the pulley, so that substantially uniform tensioning contact is obtained. The extent of convexity will vary with the width of the saw band. For the wider saws in order to secure a sufficient convexity or tensioning in the front and rear portions without buckling or distortion, the central convexity, preferably, is slightly less than that of the front and rear portions, the narrower width saws having their greatest convexity in the center. Obviously, this is a matter of adjustment of the saw for its width to the pulley face, any necessary variation in the convexity of the saw blade being made when the cutting edge of the saw band becomes badly worn and is removed for re-sharpening.

It will be evident that with a band saw tensioned on a pulley such as described, the rising tension curve of the band saw overlying the convex surface 11 at the point 12, will cause the saw to have little if any pressure contact with the pulley at the edge of this point, but that contact occurs only over the area of the contacting surface 11 forwardly of this edge and at the rear edge of the saw. When full tensioning strain is placed on the saw band by the pulleys, the strain is sustained naturally by the shorter portions of the saw constituted by the front and rear portions, the front contacting portion of the saw taking a greater tension from the contacting surfaces 11 than is applied to the rear portion through contact therewith of the flat surface 13.

It is well known that as band saw pulleys as at present constructed wear out of true through use at the front ends, leaving a relatively increased diameter at the rear portion of the pulley face, the saw band will move rearwardly on the pulley, this movement being caused by an increased strain on the rear portion of the band which increases the convexity in the rear or back edge of the saw band. With the pulley of the present invention in use, it will be seen, particularly with reference to Figures 3 and 4 of the drawings, that should the saw band tend to move its position on the pulley rearwardly, the strain on the front portion of the saw would be increased, since its convexed portion 11 provides a greater pulley diameter at this point and relatively to the rear pulley diameter, resisting rearward movement and causing the saw to return to and remain in its former position. Should the saw move its position on the pulleys forwardly, the strain on the front portion of the saw would be lessened relatively to the rear edge with a resultant increase in the convexity of the rear edge of the saw, resulting in tension being applied again to the rear edge of the saw to draw its front edge back again to its former position.

The described and illustrated pulley construction while it represents a preferable embodiment of the invention is intended as illustrative rather than restrictive thereof, and is subject to modifications and adaptations in consonance with the spirit of the invention and scope of the appended claims.

What I claim therefore, and desire to secure by Letters Patent is:—

1. A band saw provided with a pulley having its peripheral surface convexed radially outward from its front edge to a point adjacent to its center and rearwardly of said point reduced in diameter and formed with a substantially flat peripheral rearward surface of a diameter not in excess of that of the front edge of the convexed peripheral surface.

2. A band saw provided with a pulley having its peripheral surface slightly convexed radially outwardly from a minimum diameter at its front edge to a maximum diameter at a point adjacent to its center and rearwardly of said point reduced in diameter and formed with a substantially flat peripheral surface extending to its rear edge and in a plane substantially coincident with that of the front lower edge of said convexed front peripheral portion.

3. A band saw provided with a pulley having its peripheral surface convexed radially outward from a minimum diameter at its front edge to a maximum diameter at a point adjacent to and forwardly of its center and rearwardly of said point shouldered down to a diameter not in excess of that of its front convexed edge and extended rearwardly to its rear edge as a substantially flat peripheral surface lying in a plane approximately coincident with that of the minimum diameter of said front convexed portion.

4. A band saw having a pulley provided with a peripheral surface contoured to provide a convex saw tensioning surface extending from its front edge to a point adjacent to its center and having its peripheral surface rearwardly of said point reduced in diameter sufficiently to provide a tensioning surface for the rear portion of the saw of less diameter and tensioning force than the maximum diameter of the convexed front portion of said peripheral surface.

5. A band saw having pulleys provided with peripheral surfaces radially convexed to provide relatively wide tensioning surfaces increasing in diameter from their front edges rearwardly to points adjacent to their centers and rearwardly of said centers reduced to approximately the diameter of their front edges and extending in planes substantially parallel to their axes.

6. A band saw comprising pulleys provided with peripheral surfaces radially convexed to provide relatively wide saw tensioning surfaces increasing in diameter from their front edges rearwardly to points adjacent to their centers and from said centers rearwardly to their rear edges reduced in diameter to approximately the diameter of their front edges, and a band saw crowned to a convexity to provide its front portion with a convex surface substantially coincident with that of the front convexed portions of said pulleys.

7. A band saw comprising pulleys provided with peripheral surfaces radially convexed to provide relatively wide saw tensioning surfaces increasing in diameter from their front edges rearwardly to points adjacent to their centers and from said centers rearwardly to their rear edges reduced in diameter to approximately the diameter of their front edges, and extending to said rear edges in planes approximately parallel with their axes, and a band saw crowned to provide a front convexed portion substantially coincident with the front convexed portion of said pulleys and a rear edge having a diameter relative to said pulleys greater than the saw at its point of contact with the front edge of the pulley.

JAMES J. CHAPMAN.